United States Patent [19]

Eissinger et al.

[11] Patent Number: 5,658,027

[45] Date of Patent: Aug. 19, 1997

[54] BLOW MOLDED VEHICLE BUMPER SYSTEM IN METHOD

[76] Inventors: Ramon Charles Eissinger, 44290 Willis Rd., Belleville, Mich. 48111; Harvinder Sethi, 255 Cherry Valley Dr. #L21, Inkster, Mich. 48141

[21] Appl. No.: 538,527

[22] Filed: Oct. 3, 1995

[51] Int. Cl.$^6$ .................................................. B60R 19/24
[52] U.S. Cl. ...................... 293/120; 293/109; 293/121; 293/122; 293/132
[58] Field of Search .................................... 293/120, 109, 293/121, 122, 155, 132, 133, 136

[56] References Cited

U.S. PATENT DOCUMENTS

| | | | |
|---|---|---|---|
| 3,493,257 | 2/1970 | Fitzgerald et al. | 293/120 |
| 3,829,141 | 8/1974 | Igwe . | |
| 4,030,744 | 6/1977 | Schwuchow et al. | 293/122 |
| 4,073,528 | 2/1978 | Klie | 293/122 |
| 4,328,986 | 5/1982 | Weller et al. | 293/120 |
| 4,361,352 | 11/1982 | Wakamatsu | 293/120 |
| 4,457,547 | 7/1984 | Sekiyama et al. | 293/120 X |
| 4,563,028 | 1/1986 | Ogawa et al. . | |
| 4,586,738 | 5/1986 | Butler et al. . | |
| 4,762,352 | 8/1988 | Enomoto | 293/120 |
| 4,830,416 | 5/1989 | Matsuoka | 293/120 |
| 5,056,840 | 10/1991 | Eipper et al. | 293/120 |
| 5,078,439 | 1/1992 | Terada et al. | 293/121 X |
| 5,114,522 | 5/1992 | Takado et al. . | |
| 5,154,462 | 10/1992 | Carpenter | 293/120 |
| 5,271,650 | 12/1993 | Fukuhara et al. . | |
| 5,290,078 | 3/1994 | Bayer et al. . | |
| 5,404,974 | 4/1995 | Thum et al. | 293/122 X |

FOREIGN PATENT DOCUMENTS 3166918  7/1991  Japan .

*Primary Examiner*—Joseph D. Pape

[57] ABSTRACT

A vehicle bumper system, having an elongated reinforcing member extending substantially across the width of the vehicle. The reinforcing member has a hollow cross section and an attaching surface. A hollow, blow molded bumper, at least partially envelopes the reinforcing member and is secured to the attaching surface. The bumper extends across the width of the vehicle and defines a space between the reinforcing member and the outer edge of the vehicle. The bumper compresses the space when the bumper system contacts an obstacle. Attaching posts on the inner portion of the reinforcing member secures the bumper system to the vehicle.

8 Claims, 3 Drawing Sheets

BLOW MOLDED VEHICLE BUMPER SYSTEM IN METHOD

BACKGROUND OF THE INVENTION

1. Field of the Invention

The present invention relates to a vehicle bumper system and method of making the same.

2. Description of the Related Art

Vehicle bumpers systems are generally designed to serve two functions. The first function is to protect the vehicle from damage due to low speed contacts with obstacles. Low speed collisions are generally defined as 5 miles per hour or less. The bumper system should withstand these low speed collisions without damage, either to the vehicle bumper system or to the vehicle. A secondary function of a vehicle bumper system is to manage energy in a higher speed collision to avoid or reduce injury to the vehicle passengers. High speed collisions are those greater than 5 miles per hour. High speed collisions will likely result in damage to either the vehicle bumper system or the vehicle. The way in which energy from the collision is managed through the bumper system and vehicle is designed to provide a repeatable and known collapse of the vehicle structure.

It is desirable to manufacture a bumper that is both lightweight and strong. Current lightweight bumpers are manufactured with injection molded plastic material. It is desirable to manufacture bumpers from a blow molded plastic material to further reduce the bumper weight and to use lower cost blow molding plastic materials. Several US patents have published designs for blow molded automotive bumper systems. U.S. Pat. No. 5,271,650 teaches a method of molding a blow molded bumper system having an integral attaching frame. The attaching frame is generally made of metal and serves to attach the bumper system to the vehicle. Two frames secure the bumper system to the vehicle. Each frame is mounted to the outer edge of the bumper system and serve to transmit collision energy through the bumper system to the vehicle.

It is useful to provide a vehicle bumper system that is both rigid across the frontal width of the vehicle for optimal energy management in a high speed collision, yet compliant to reduce damage in low speed collisions. Bumper systems as exemplified by U.S. Pat. Nos. 5,271,650 and 4,586,738, teaching unreinforced blow molded bumper systems attached the frontal edge of a vehicle. Making unreinforced bumpers sufficiently rigid to withstand both low speed collisions without damage and higher speed collisions with proper energy management requires the use of thick blow molded wall sections and thereby increasing material cost and bumper systems weight.

It has also been known to add foam within a vehicle bumper, as exemplified by U.S. Pat. No. 4,563,028. Foam stiffeners have been pre-molded and then assembled in place within the bumper. Use of pre-formed foam blocks require adhesives or fasteners and large access holes to attach the foam to the bumper system. It is desirable to place foam within a hollow bumper system without the need for adhesives, fasteners or large access holes.

It is further desirable to provide a vehicle bumper system that is capable of withstanding low speed collisions without damage, while providing a rigid cross-frontal area to controllably transmit energy from high speed collisions to the vehicle.

SUMMARY OF THE INVENTION

The foregoing problems are overcome by providing a vehicle bumper system having an elongated reinforcing member extending substantially across the width of the vehicle. The reinforcing member has a hollow cross section and an attaching surface. A hollow, blow molded bumper, at least partially envelopes the reinforcing member and is secured to the attaching surface. The bumper extends across the width of the vehicle and defines a space between the reinforcing member and the outer edge of the vehicle. The bumper compresses the space when the bumper system contacts an obstacle. Attaching posts on the inner portion of the reinforcing member secure the bumper system to the vehicle. The bumper optionally includes transverse portions integrally blow molded on both ends of the reinforcing member to extend longitudinally along the vehicle.

The foregoing vehicle bumper system is manufactured by providing a blown molding apparatus being movable between open and closed positions. The apparatus has two molds forming the bumper system. An elongated reinforcing member is placed adjacent one mold when the apparatus is in the open position. A tubular parison of plastic material is extruded between the molds and adjacent the reinforcing member. The molds are closed and the parison is inflated, thus causing the plastic material to contact and at least partially envelop the reinforcing member. After the parison has cooled, the plastic material solidifies to form a hollow bumper assembly. Foam material is optionally injected within the space contained by the hollow bumper to add stiffness or to absorb energy.

The present invention allows the hollow bumper assembly to absorb low speed collisions without damage. The space within the bumper may be sealed to provide a chamber that urges the bumper to rebound to its free stated when compressed. Alternatively, the hollow space may be filled with the foam material to provide either greater resistance to compression or to allow the bumper to be vented and still provide a rebound. High speed collisions transmit energy through the reinforcement member to the width of the vehicle.

The invention is useful for both frontal and rear impacts and is equally suitable for front and rear bumper systems. These, and other advantages and features of the present inventions, will become more apparent from the detailed description of the preferred embodiments which follows, together with the drawings.

DETAILED DESCRIPTION OF THE PREFERRED EMBODIMENTS

Figure 1:
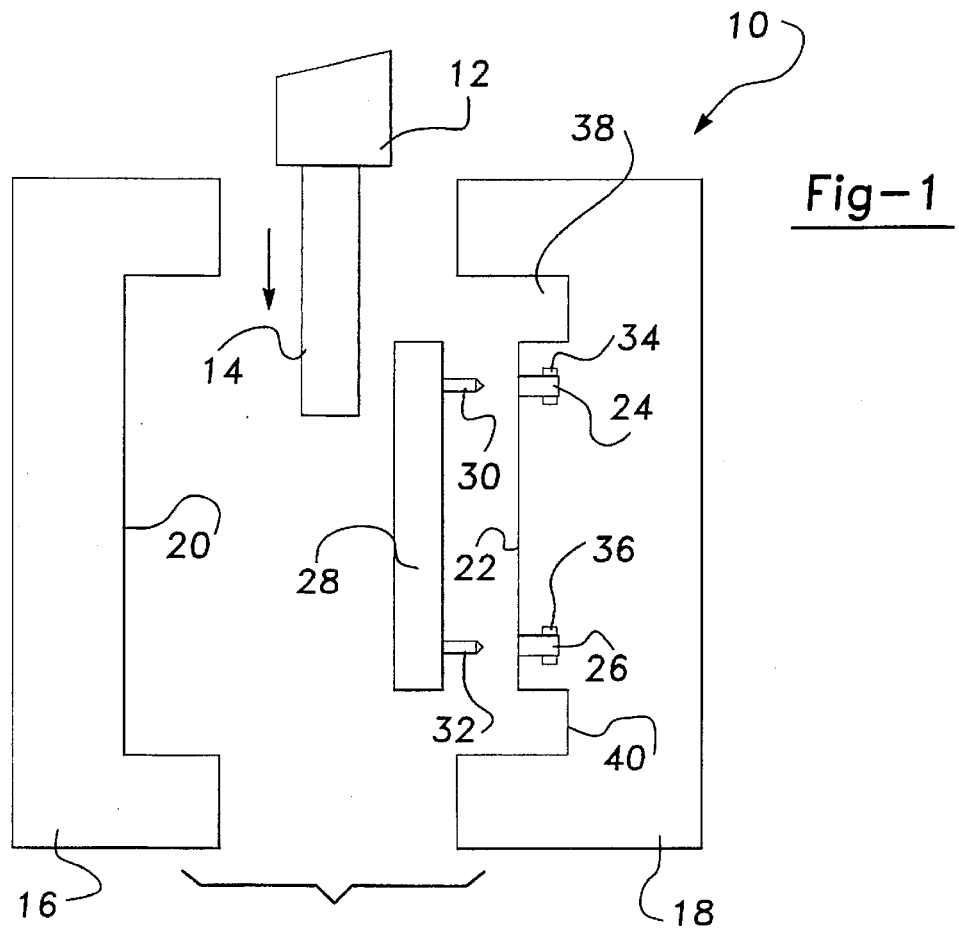
FIG. 1 is a cross-sectional view of a blow molding apparatus in the open position.
Figure 2:
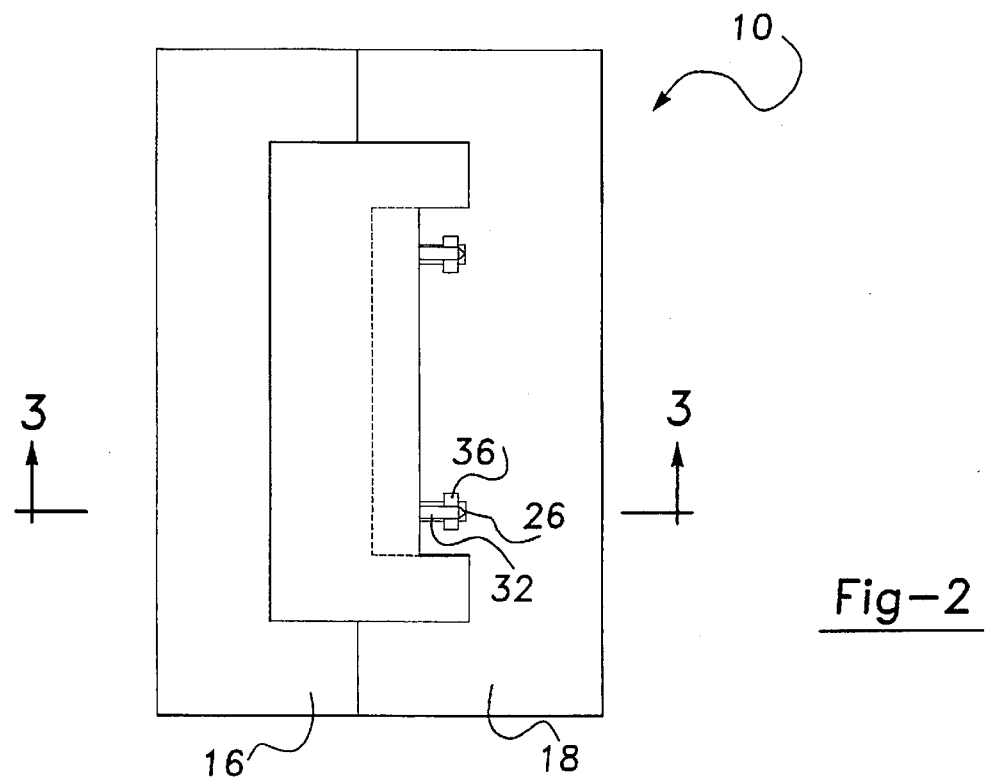
FIG. 2 is the blow molding apparatus shown in FIG. 1 in the closed position.

Illustrated in FIGS. 1 and 2, is a blow molding apparatus 10 as used in the present invention. The extruder 12 extrudes a hot, pliable parison 14 between matched the metal molds 16, 18. The interior surfaces 20, 22 form the exterior surface of the final blow molded article. The mold 18 includes apertures 24, 26 on the surface 22. An elongated reinforcing member 28, designed to be integrally molded within a vehicle bumper system, is placed between the molds 16, 18. The reinforcing member 28 is designed to extend substantially across the width of a vehicle. As will be more fully described below, the reinforcement member 28 has a hollow, generally box-shaped cross-sectional area designed to distribute energy from an impact through the area in the vicinity of the posts 30, 32 to a vehicle. The reinforcement member 28 is generally made from a metal material, however, composites and reinforced plastic materials are also suitable. The posts 30, 32 are positioned generally transverse to the reinforcing member 28 and are inserted within apertures 24, 26 as shown. The posts 30, 32 are usually threaded and are retained securely within apertures 20, 24 by retention means 34, 36. The retention means 34, 36 engages threads on the posts 24.26 and draw the reinforcement member 28 securely against the surface 22.

Figure 3:
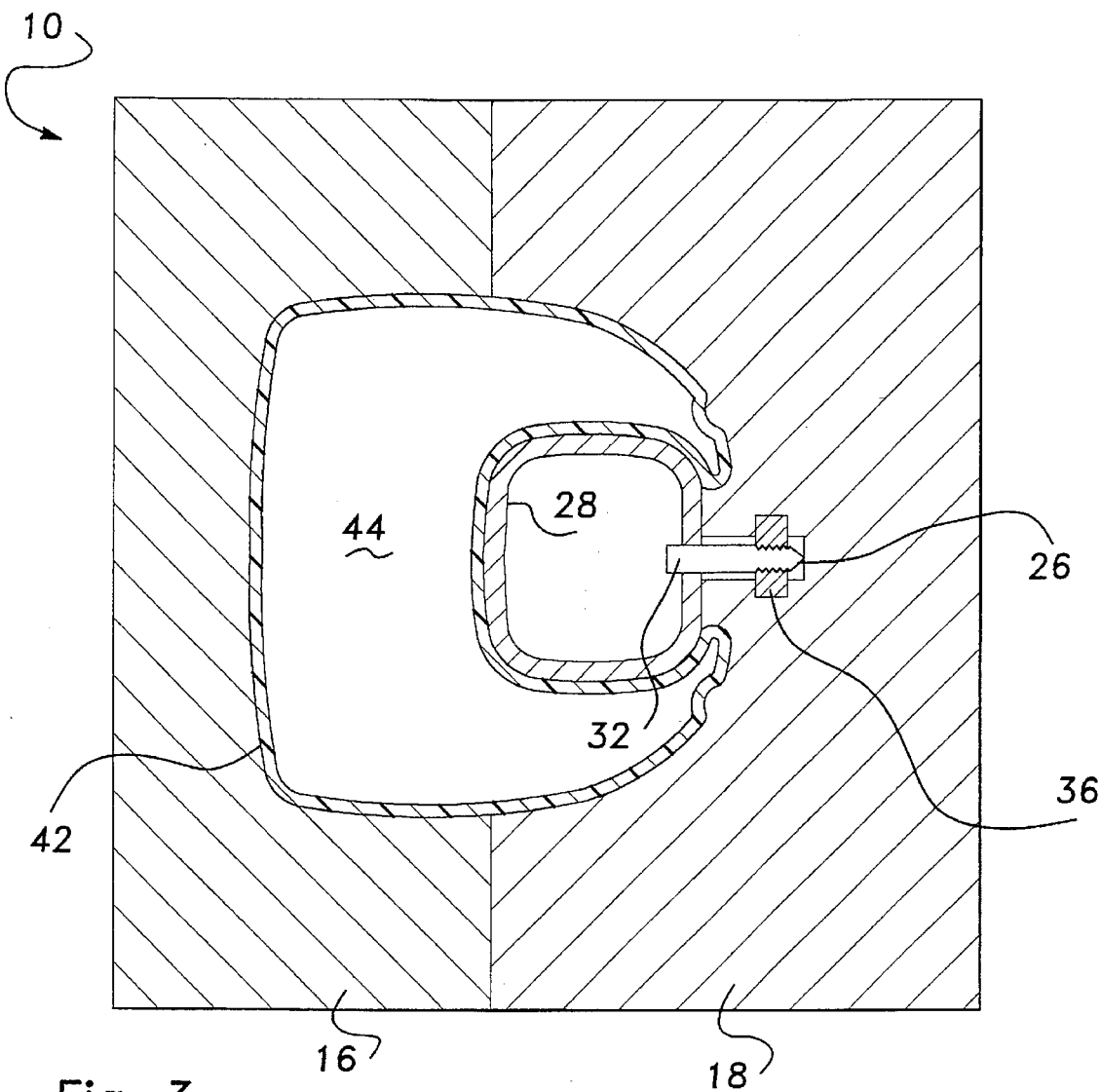
FIG. 3 is a cross-sectional view taken along the line 3—3, in FIG. 2.

The mold 18 optionally includes recess portions 38, 40 immediately adjacent both ends of the reinforcement member 28. Recess portions 38, 40 extend transversely from the reinforcement member 28. While the molds 16, 18 are in the open position, a length of parison 14 is dispensed between the molds 16, 18 and adjacent to the reinforcement member 28. The molds 16, 18 are moved to the closed position as illustrated in FIG. 2. The upper and lower ends of the parison 14 are sealed by the closing mold halves and the parison is inflated through a blow pin (not shown). The inflating parison 14 conforms to the shape of the molds 20,22 and at least partially envelopes the reinforcement member 28. The ends of the reinforcement member 28 may be closed to reduce possibility of the parison 14 tearing or inflating within reinforcement member 28. Reinforcement member 28 is encased on at least three sides and on both ends by the inflated parison 14 as illustrated in FIG. 3.

Figure 4:
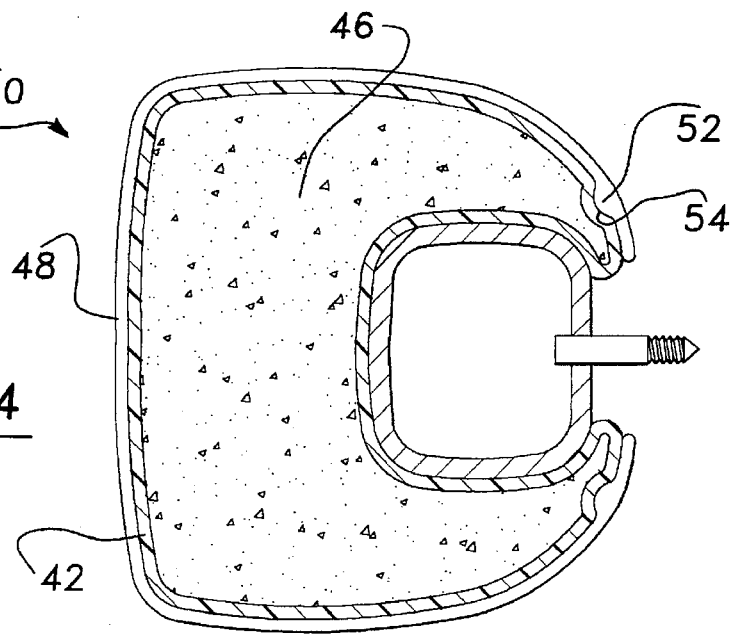
FIG. 4 is the bumper apparatus shown in FIG. 3 with an exterior facia cladding and interior energy absorbing foam.

The parison 14 is allowed to cool and solidify around the reinforcement member 28. The cooled parison 14 forms a hollow bumper 42. A space 44 between reinforcement member 28 and the edge of the vehicle provides a compressible volume to absorb low speed collisions. Space 44 may be sealed to increase the rebound of the bumper 42 or optionally space 44 may be filled with an energy absorbing foam 46 as illustrated in FIG. 4. An energy absorbing form may be inserted within space 44 at any time after the molding process. To reduce the manufacturing steps needed to produce the vehicle bumper system of the present invention, a foam precursor (not shown) may be introduced within space 44 through the blow pin (not shown) while the bumper 42 is still within blow molding apparatus 10. The expanding foam precursor fills space 44 and solidifies to form an energy-absorbing foam 46.

When bumper 42 is made from a polyethylene material, it will tend to exhibit a course exterior finish. Common trends among automotive bumper systems is to paint the exterior surface of the bumper the same color as the vehicle body panels. To improve the appearance of the bumper System and to provide a color, a decorative exterior cladding or facia may be applied on top of bumper 42. A decorative facia 48, as shown in FIG. 4, may be applied over the bumper 42 to form a bumper system 50. The facia 48 may be made from a reaction injection molded thermoset plastic such as urethane or an injection molded thermoplastic such as TPO or TPU. The facia 48 may be integrally formed and secured to bumper 42 as described in U.S. Pat. No. 5, 114,522, or alternatively, the facia 48 may be separately formed and applied atop the surface of the bumper 42. A tab 52 on the facia 48 fits within a slot 54 to assist in retaining the facia 48 atop the bumper 42 without additional fasteners or adhesives.

Figure 5:
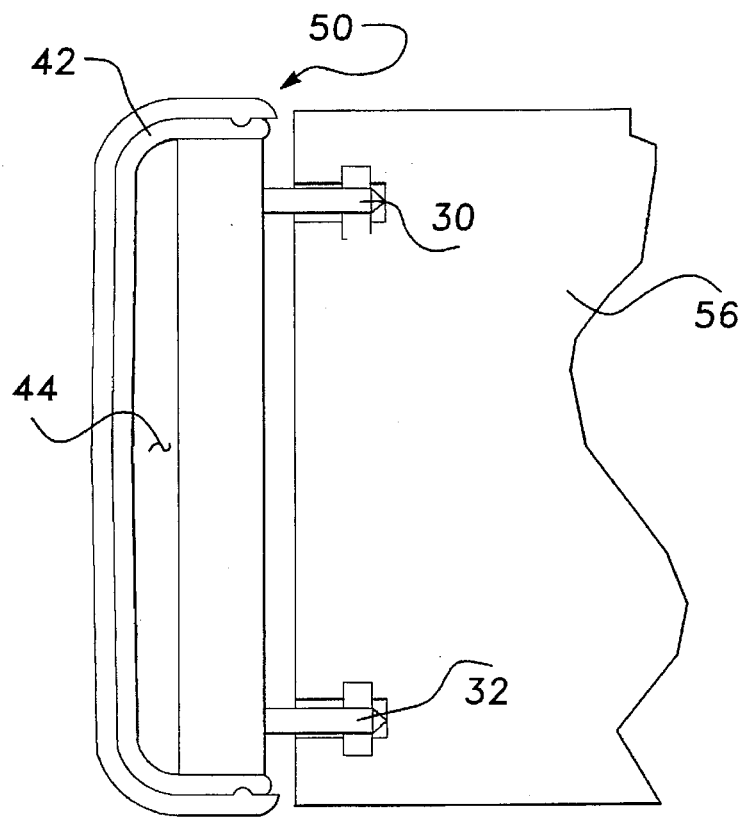
FIG. 5 is the vehicle bumper system illustrated in FIG. 4, installed on a vehicle.
Figure 6:
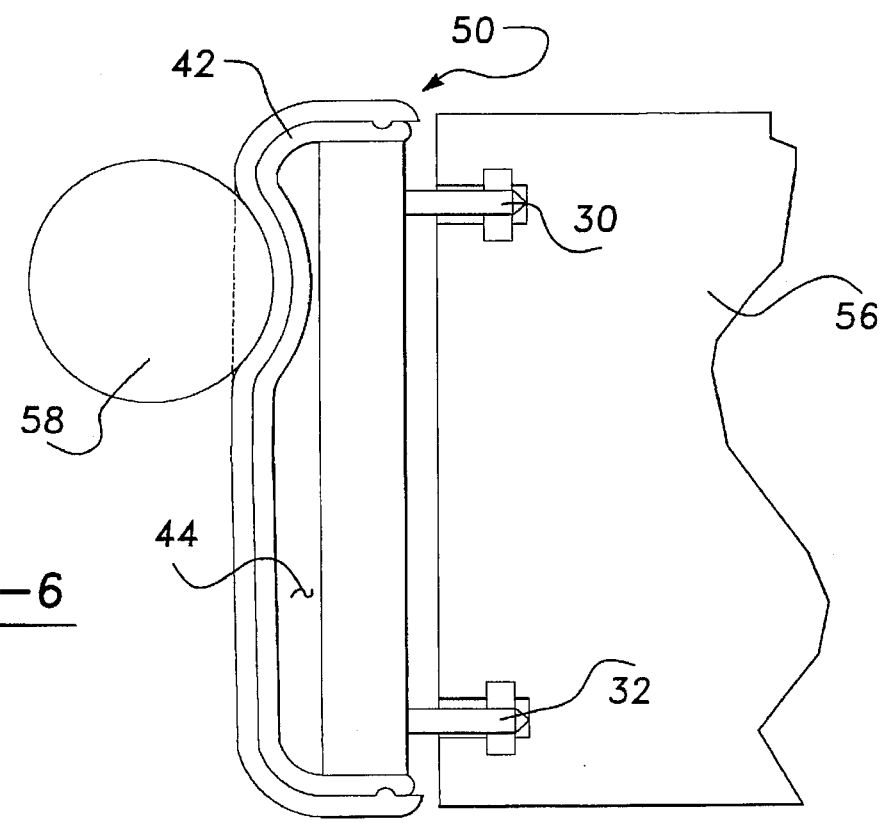
FIG. 6 is the vehicle and bumper system illustrated in FIG. 5, contacting an obstacle.

The bumper system 50 is secured to a vehicle 56 by the posts 30, 32 as shown in FIGS. 5 and 6. The bumper system 50 is shown in its normal free state in FIG. 5. When the vehicle 56 contacts an obstacle 58 at low speeds, the bumper 42 compresses and reduces the volume of space 44. If space 44 is filled with Foam 46, foam 46 also compresses to partially absorb the energy of the impact. After the obstacle is removed, the bumper system 50 rebounds to its normal free state. The rebound results from the innate elasticity (spring like action) of the bumper 42 in conjunction with stiffness of the composite section comprised of the bumper 42 and the reinforcement member 28. If foam is used to fill the hollow space between the reinforcing member and a blow molding, the resulting bumper will be more resistant to local deformation resulting from low speed impacts. In cases of high speed collisions, it depends how much deformation can take place, It depends upon how strong the structure of the car is built. The vehicle bumper system is designed to operate so that bumper 42 absorbs energy from low speed collisions without damage. The same bumper system may be used in different countries to meet different local requirements for low speed collisions. For example, the bumper may be filled with a reinforcing foam to withstand collisions upwards of 5 miles per hour. In situations where this degree of protection is not needed, the bumper system may be unfilled. While the bumper would provide a lesser degree of energy absorbing protection, it would be lighter and less expensive to produce. The same tooling can be used to manufacture bumpers with different functional performance. The walls of bumper 42 may be made relatively thin, from as low as 2 mm to 4 mm. Light weight and easily moldable materials, such as polypropylene and high-density polyethylene are suitable for the present invention. A variety of energy absorbing foam materials 46 are also commercially available. Suitable foam materials include oak, expanded polypropylene and polyurethane.

The characteristics of a suitable foam depends upon density, load/deflection characteristics, fusion of the molecules, recoverability, thermal stability, moldability, and recylability.

While the present invention is illustrated by means of several preferred embodiments, one of ordinary skill in the art will recognize that modifications and improvements can be made while remaining within the spirit and scope of the invention, as defined by the following claims.

What is claimed:

1. A vehicle bumper system comprising: an elongated reinforcing member extending substantially across the width of said vehicle, said reinforcing member having a hollow cross-section and an attaching surface; and a hollow blow molded bumper at least partially enveloping said reinforcing member and secured to said attaching surface, said bumper extending across the width of said vehicle and defining a space whereby said bumper compresses said space when said bumper system contacts an obstacle.

2. The vehicle bumper system of claim 1, further comprising transverse portions integrally blow molded on said bumper outwardly of said reinforcing member and extending longitudinally along said vehicle.

3. The vehicle bumper system of clam 1, wherein said bumper has attaching portions that engage said attaching surface and secure said bumper to said reinforcing member.

4. The vehicle bumper system of claim 1, further comprising posts secured to said reinforcing member, said posts securing said bumper system to said vehicle.

5. The vehicle bumper system of claim 4, wherein said posts are positioned generally transverse to said reinforcing member.

6. The vehicle bumper system of claim 1, further comprising an energy absorbing foam substantially filing said space and urging said bumper to return to a free state when said foam is compressed.

7. The vehicle bumper system of claim 1, wherein said reinforcing member is metal or composite plastic.

8. The vehicle bumper system of claim 1, wherein said bumper rebounds to a free state when said vehicle encounters a barrier obstacle at speeds less than 5 miles per hour.

\* \* \* \* \*

UNITED STATES PATENT AND TRADEMARK OFFICE
CERTIFICATE OF CORRECTION

PATENT NO. : 5,658,027
DATED : August 19, 1997
INVENTOR(S) : Ramon Charles Eissinger and Harvinder Sethi

It is certified that error appears in the above-identified patent and that said Letters Patent is hereby corrected as shown below:

On the title page, insert the following information:
Attorney, Agent, or Firm - Damian Porcari Assignee: Ford Global Technologies, Inc. Dearborn, MI Signed and Sealed this Twenty-third Day of December, 1997

Attest:

BRUCE LEHMAN

Attesting Officer

Commissioner of Patents and Trademarks